(12) United States Patent
Srinivasan et al.

(10) Patent No.: US 10,708,185 B2
(45) Date of Patent: Jul. 7, 2020

(54) DYNAMIC NEXT-HOP SELECTION FOR ROUTES IN A NETWORK FABRIC

(71) Applicant: Cisco Technology, Inc., San Jose, CA (US)

(72) Inventors: Sathish Srinivasan, Fremont, CA (US); Shyam Kapadia, San Jose, CA (US); Lukas Krattiger, Pleasanton, CA (US); Rajesh Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 15/827,183

(22) Filed: Nov. 30, 2017

(65) Prior Publication Data

US 2019/0166048 A1     May 30, 2019

(51) Int. Cl.
*H04L 12/741*     (2013.01)
*H04L 12/713*     (2013.01)
*H04L 12/46*      (2006.01)
*H04L 29/06*      (2006.01)

(52) U.S. Cl.
CPC .......... *H04L 45/745* (2013.01); *H04L 45/586* (2013.01); *H04L 12/4641* (2013.01); *H04L 63/0272* (2013.01)

(58) Field of Classification Search
None
See application file for complete search history.

(56) References Cited

U.S. PATENT DOCUMENTS

| | | |
|---|---|---|
| 6,970,464 B2 | 11/2005 | Xu et al. |
| 8,948,181 B2 | 2/2015 | Kapadia et al. |
| 8,953,590 B1 | 2/2015 | Aggarwal et al. |
| 9,225,597 B2 | 12/2015 | Tubaltsev et al. |
| 9,258,266 B2 | 2/2016 | Natarash et al. |
| 9,590,824 B1 | 3/2017 | Sikand et al. |
| 2014/0101302 A1* | 4/2014 | Yang .................. H04L 41/0813 709/224 |

(Continued)

OTHER PUBLICATIONS

Johnson, Craig, "Overlay Networks in the Datacenter," retrieved from http://dfw.cisco-users.org/zips/20150204_DFWCUG_Overlay_Networks_In_The_Datacenter.pdf, Feb. 4, 2015, 97 pages.

(Continued)

*Primary Examiner* — Ayaz R Sheikh
*Assistant Examiner* — Sori A Aga
(74) *Attorney, Agent, or Firm* — Edell, Shapiro & Finnan, LLC (57) ABSTRACT

A first network device advertises routes of locally connected routes/subnetworks based on the connectivity of the host with respect to peer network devices. The first network device establishes a virtual port channel associated with a virtual network address. The virtual port channel includes the first network device associated with a first network address and a second network device associated with a second network address. The first network device detects that a host is connected to the first network device and determines a next hop address to associate with the host. The next hop address is determined based on whether the host is also connected to the second network device of the virtual port channel. The first network device generates a route advertisement associating the next hop address with the host.

18 Claims, 7 Drawing Sheets

(56) References Cited

U.S. PATENT DOCUMENTS

| | | | |
|---|---|---|---|
| 2014/0112122 A1* | 4/2014 | Kapadia | H04L 45/74 370/219 |
| 2015/0295849 A1 | 10/2015 | Xia et al. | |
| 2015/0341220 A1 | 11/2015 | Sikand et al. | |
| 2016/0301608 A1 | 10/2016 | Natarajan et al. | |
| 2017/0171057 A1 | 6/2017 | Dong et al. | |

OTHER PUBLICATIONS

Sajassi, et al., "BGP MPLS-Based Ethernet VPN," Internet Engineering Task Force (IETF), Request for Comments: 7432, Standards Track, Feb. 2015, 56 pages.

Rabadan, et al., "IP Prefix Advertisement in EVPN," draft-rabadan-l2vpn-evpn-prefix-advertizement-03, Internet Engineering Task Force (IETF), Internet-Draft, L2VPN Workgroup, Standards Track, Oct. 16, 214, 20 pages.

Sajassi, et al., "Integrated Routing and Bridging in EVPN," draft-ietf-bess-evpn-inter-subnet-forwarding-01, Internet Engineering Task Force (IETF), Internet-Draft, L2VPN Workgroup, Standards Track, Oct. 18, 2015, 26 pages.

Cisco, "VXLAN Design with Cisco Nexus 9300 Platform Switches," Guide, Oct. 2014, 39 pages.

* cited by examiner

DYNAMIC NEXT-HOP SELECTION FOR ROUTES IN A NETWORK FABRIC

TECHNICAL FIELD

The present disclosure relates to route advertisement in computer networking.

BACKGROUND

Network elements in a computer network may advertise routes to hosts/subnets that are attached to particular network elements via a control plane, such as a Border Gateway Protocol (BGP) Ethernet Virtual Private Network (EVPN) control plane. The route advertisements will associate the host/subnet with a "next hop" address associated with the particular network element to which the host/subnet is attached.

Network elements in a computer network, such as a Virtual Extensible Local Area Network (VXLAN) EVPN fabric, may be grouped to provide redundancy and increase bandwidth for connected devices, such as servers. For instance, Virtual Port Channel (VPC) groups are one example of a Multi-Chassis Link Aggregation Group (MC-LAG) that group multiple network elements. VPC peer network elements typically advertise routes to hosts and/or subnets that are attached to the VPC peer network elements in a control plane (e.g., Border Gateway Protocol (BGP) EVPN control plane) with a virtual network address associated with the VPC. In some instances, the virtual network address is a Virtual Tunnel Endpoint (VTEP) Internet Protocol (IP) address that is configured as a secondary address on a Network Virtualization Endpoint (NVE) interface of the peer VPC network elements. However, each of the peer VPC network elements is also associated with its own network address (e.g., IP address) on the NVE interface.

DESCRIPTION OF EXAMPLE EMBODIMENTS

Overview

A method is provided for a first network device to advertise routes of locally connected routes/subnetworks. The method comprises establishing a virtual port channel associated with a virtual network address. The virtual port channel comprises a plurality of network devices including the first network device associated with a first network address and a second network device associated with a second network address. The method further comprises detecting that a host is connected to the first network device and determining a next hop address to associate with the host. The next hop address is determined based on whether the host is also connected to the second network device of the virtual port channel. The method also comprises generating a route advertisement associating the next hop address with the host.

DETAILED DESCRIPTION

Using the virtual network address of a VPC provides several advantages. All of the other network elements (and hosts attached to the other network elements) only store a single network address for the peered VPC network elements (and hosts attached to the VPC). In this way, the number of network addresses stored at each network element scales with the number of VPCs rather than with the number of individual network elements. Specific to a VXLAN EVPN implementation, which is a Media Access Control (MAC) in IP/User Datagram Protocol (UDP) overlay, the MAC table on the remote network elements can use the virtual network address of the VPC as the destination IP address for the VXLAN header whenever traffic is directed to an orphan or dual-homed host behind a particular VPC. Additionally, in the case of a single VPC peer failure, the remote network elements do not need to update the network address from the virtual network address of the VPC. The underlay will detect the VPC peer failure and instead of an Equal Cost Multi-Path (ECMP) route, the virtual network address will be carried on a single path that is advertised by the VPC peer that remains functional.

However, one issue with using the virtual network address of the VPC arises when some of the traffic (e.g., 50% on average) destined to orphan hosts is directed to the wrong VPC peer based on the underlay ECMP hash, and travels across the VPC peer link to reach the final destination. This situation may occur for both layer 3 (i.e., routed) and layer 2 (i.e., bridged) traffic.

In one example, an EVPN multi-homing approach with Ethernet Segment Identifier (ESI) uses the individual network addresses of the VPC peer network elements to advertise the reachability of host (e.g., MAC and optionally IP address) and subnet prefix routes. While this ensures that orphan host reachability will only be advertised from its directly attached network element, for multi-homed hosts, the remote network elements will see an N-way ECMP route on the overlay, which requires support of MAC multipath routing. Some network elements may not support MAC multipath routing, and the convergence duration in case of a node failure may be quite long for network elements that do support MAC multipath routing, especially for multi-homed host routes.

The techniques presented herein provide a hybrid approach in which the virtual network address is advertised for dual homed hosts (and dual attached subnets) and the individual network address of the network element is advertised for orphan hosts (and orphan subnets). This hybrid approach optimizes Forwarding Information Base (FIB) space, traffic forwarding, latency, and convergence.

Figure 1:
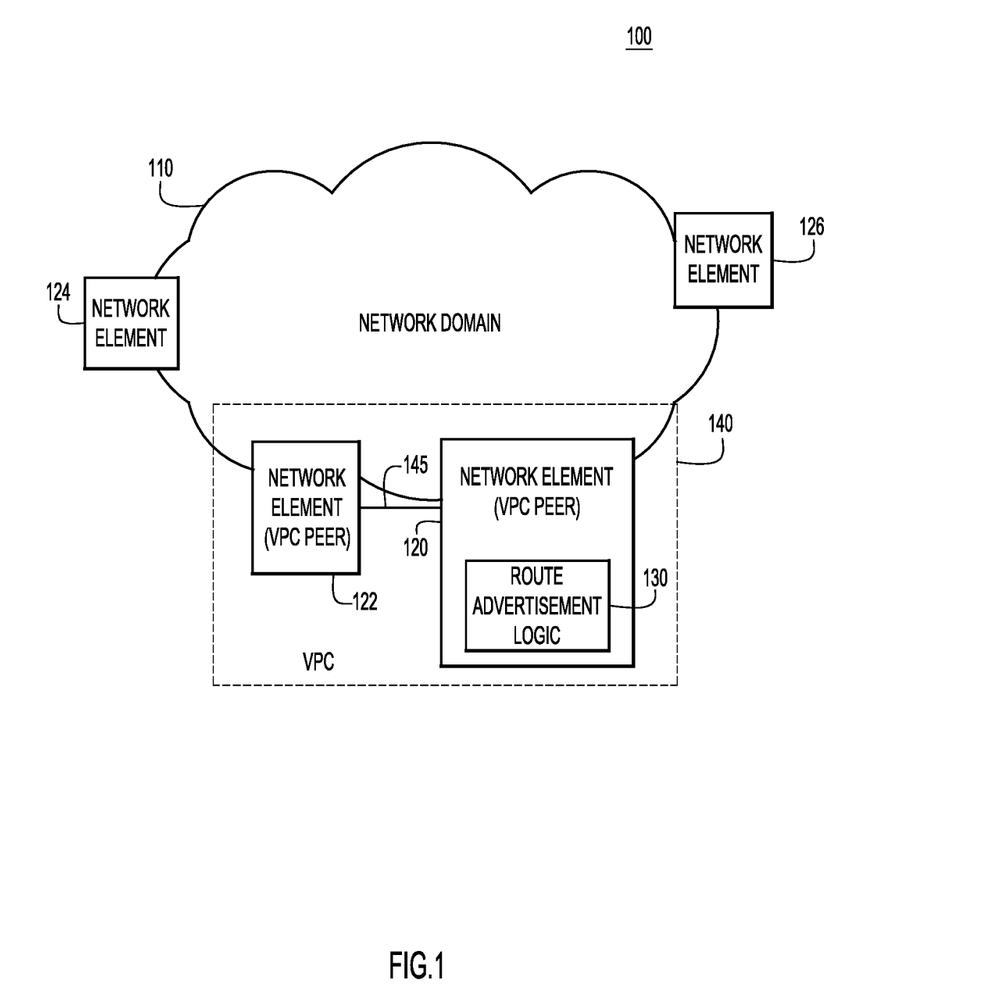
FIG. 1 is a simplified block diagram of a system for advertising routes in a network domain that includes peer VPC network elements, according to an example embodiment.

Referring now to FIG. 1, a network system is shown that is configured to advertise routes across a network domain 110. In one example, the network domain 110 may be an EVPN domain. The network domain 110 includes a plurality of network elements 120, 122, 124, and 126. The network elements 120, 122, 124, and 126 may include routers, switches, or other physical or virtual network devices that route traffic throughout the network domain 110. The network domain 110 may configure the network elements 120, 122, 124, and 126 in a number of topologies (e.g., spine/leaf, ring, star, mesh, etc.). A route advertisement logic 130 in the network element 120 is configured to advertise routes (e.g., via Border Gateway Protocol (BGP) or Interior Gateway Protocol (IGP)) for hosts and subnetworks that are attached to the network domain 110 via the network element 120. Though not explicitly depicted in FIG. 1, the other network elements 122, 124, and 126 may also include similar route advertisement logic.

Network elements 120 and 122 are paired in a Virtual Port Channel (VPC) 140 as peer devices. A peer link 145 connects the two VPC peer devices 120 and 122 and enables network traffic to quickly flow between the two VPC peers. The VPC 140 is assigned a virtual network address that the underlay of the network domain 110 can route to either VPC peer 120 or VPC 122. Additionally, in configuring the VPC 140, each of the VPC peers 120 and 122 is informed of any hosts or subnetworks that connect to the network domain 110 via either of the VPC peers 120 and 122.

In order to optimize the usage of resources and forwarding in a network domain (e.g., a VXLAN BGP EVPN fabric with VPC), the network elements advertise host routes and subnetwork route prefix reachability with a specific next hop address. For dual homed prefixes (e.g., hosts or subnetworks) the routes are advertised with the virtual network address associated with the VPC. For single homed/orphan prefixes (i.e., hosts or subnetworks) the routes are advertised with the individual network address of the network element to which the host/subnetwork is attached. In one example, the host routes referred to herein include MAC, IPv4 and/or IPv6 addresses.

The techniques described herein optimize forwarding, latency, and convergence by only advertising the most appropriate host routes. By only advertising the optimal routes with an intelligently selected next hop address, the remote network elements are not forced to use hardware FIB resources on saving suboptimal routes. These optimizations provide a distinct improvement in scalable data center network solutions.

Figure 2A:
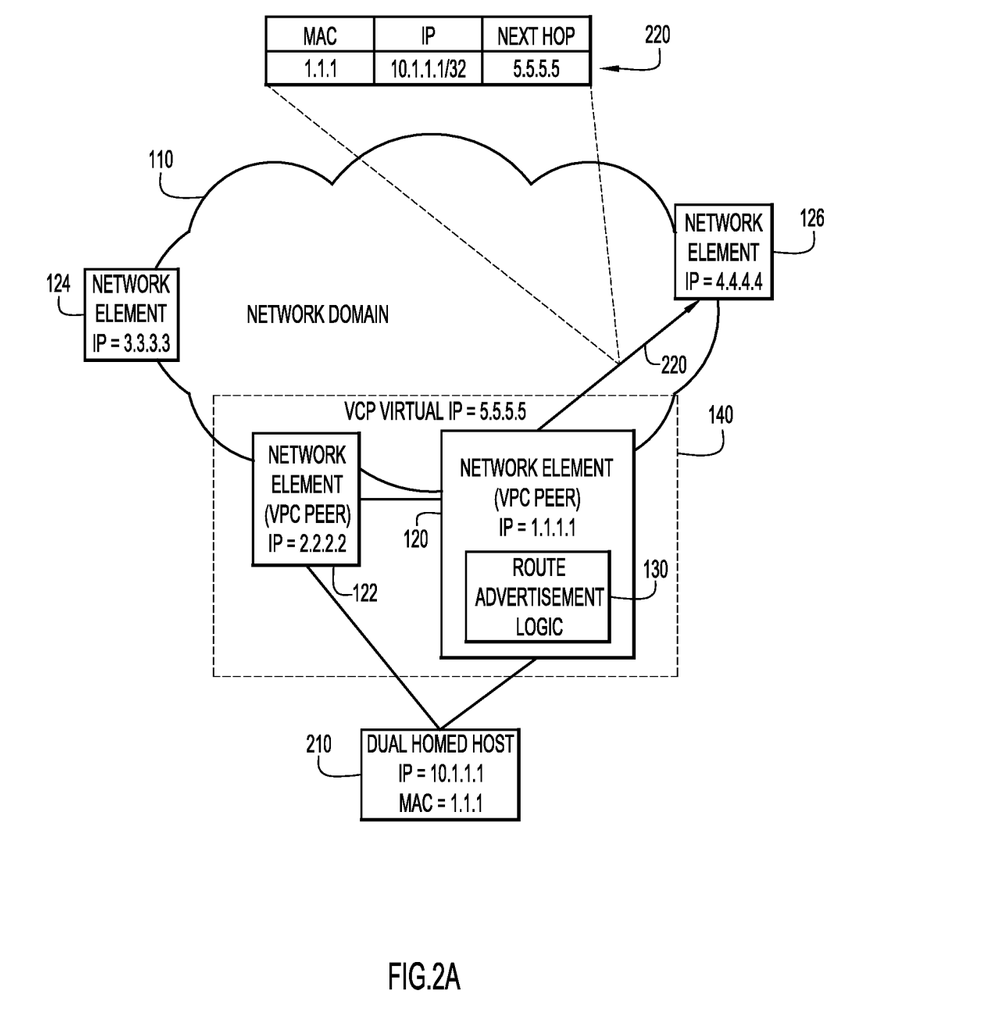
FIG. 2A illustrates advertising a dual homed host using the virtual network address of the VPC, according to an example embodiment.

Referring now to FIG. 2A, a simplified block diagram illustrates how the route advertisement logic 130 optimizes the route advertisement for a dual homed host 210 that is attached to both VPC peers 120 and 122 of the VPC 140. When the dual homed host 210, which has a MAC address of 1.1.1 and an IP address of 10.1.1.1, connects to the network domain 110 via both of the VPC peers 120 and 122, the route advertisement logic 130 sends a route advertisement message 220 (e.g., a BGP update message) throughout the network domain 110, such as to network element 126. The route advertisement message 220 includes the MAC address of the host 210 (e.g., 1.1.1), the IP address/range of the host 210 (e.g., 10.1.1.1/32), and a next hop address that indicates the IP address to which messages to the host 210 should be addressed from within the network domain 110. Since the dual homed host 210 is attached to both of the VPC peers 120 and 122, the route advertisement logic 130 includes the IP address of the VPC (e.g., 5.5.5.5), which the underlay of the network domain 110 may route to either network element 120 or network element 122. In other words, any messages sent over the network domain 110 to the host 210 will be addressed to the virtual network address (e.g., 5.5.5.5) of the VPC 140 rather than network address of either of the network elements 120 (e.g., 1.1.1.1) or 122 (e.g., 2.2.2.2).

Figure 2B:
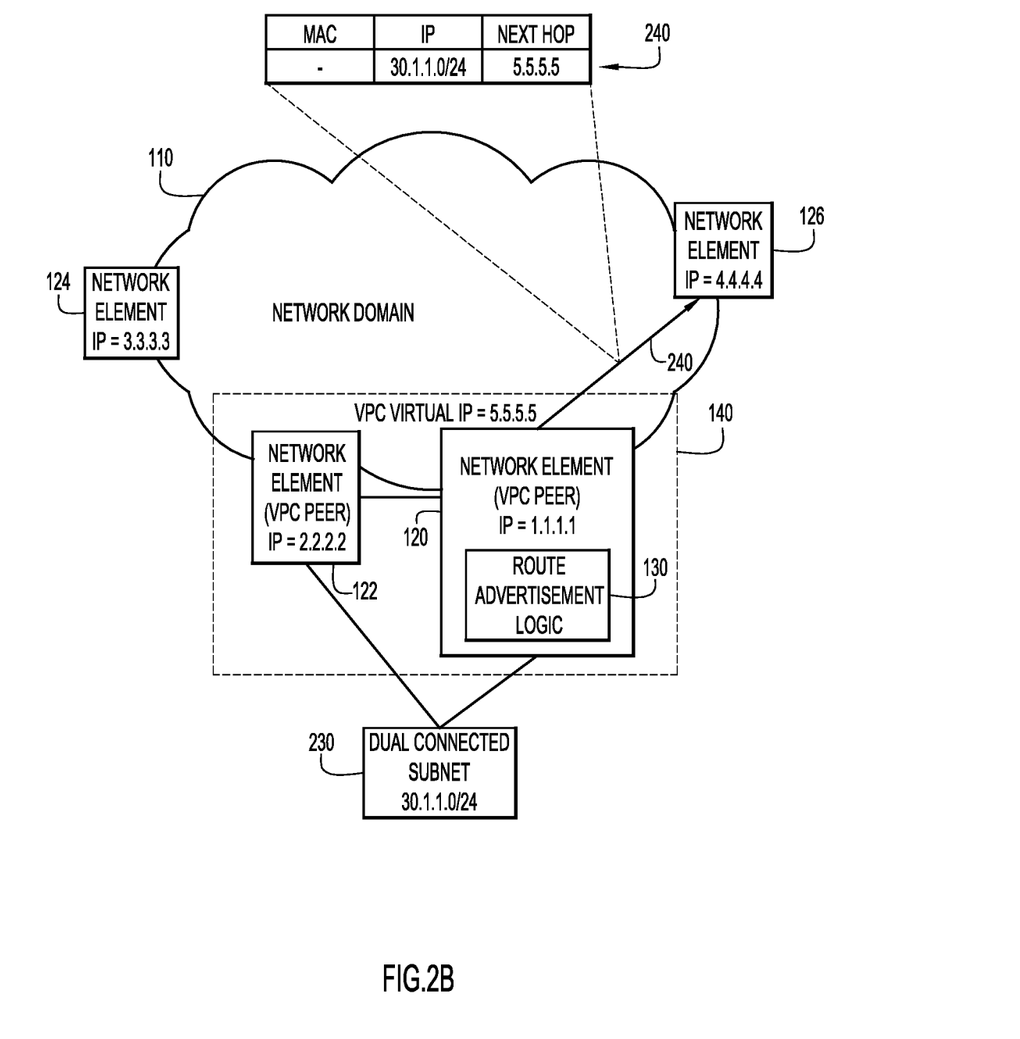
FIG. 2B illustrates advertising a dual connected subnet using the virtual network address of the VPC, according to an example embodiment.

Referring now to FIG. 2B, a simplified block diagram illustrates how the route advertisement logic 130 optimizes the route advertisement for a dual connected subnetwork 230 that is connected to both VPC peers 120 and 122 of the VPC 140. Similar to the example described with respect to FIG. 2A, when the dual connected subnetwork 230, which includes a range of IP addresses (e.g., 30.1.1.0/24), connects to the network domain 110 via both of the VPC peers 120 and 122, the route advertisement logic 130 sends a route advertisement logic message 240 (e.g., a BGP update message) throughout the network domain 110, such as to network element 126. The route advertisement message 240 does not include a MAC address, since the subnetwork 230 may include multiple devices with multiple MAC addresses. However, the advertisement message 240 includes the IP address/range of the subnetwork 230 (e.g., 30.1.1.0/24), and a next hop address that indicates the IP address to which messages to hosts on the subnetwork 230 should be addressed from within the network domain 110. Since the dual connected subnetwork 230 is attached to both of the VPC peers 120 and 122, the route advertisement logic 130 includes the IP address of the VPC (e.g., 5.5.5.5), which the underlay of the network domain 110 may route to either network element 120 or network element 122. In other words, any messages sent over the network domain 110 to hosts on the subnetwork 230 will be addressed to the virtual network address (e.g., 5.5.5.5) of the VPC 140 rather than network address of either of the network elements 120 (e.g., 1.1.1.1) or 122 (e.g., 2.2.2.2).

For ease of illustration, the examples depicted in FIG. 2A and FIG. 2B show route advertisements for a dual homed host 210 and a dual connected subnetwork 230, respectively. However, a similar route advertisement may be implemented for a host/subnetwork that is connected to more than two network elements, e.g. a multi-homed host or N-way connected subnetwork. In these instances, the virtual network address associated with the aggregated N-way peered network elements (i.e., analogous to the two-way VPC 140 and its associated virtual network address) is advertised for the N-way host/subnetwork if all of the N-way peered network elements are all actively connected to the multi-homed host or N-way connected subnetwork. If any of the peered network elements are not connected to the host/subnetwork, then one or more route advertisements are propagated with the network address of the individual network element(s) that is/are connected to the host/subnetwork, as described hereinafter with respect to FIG. 3A and FIG. 3B.

Figure 3A:
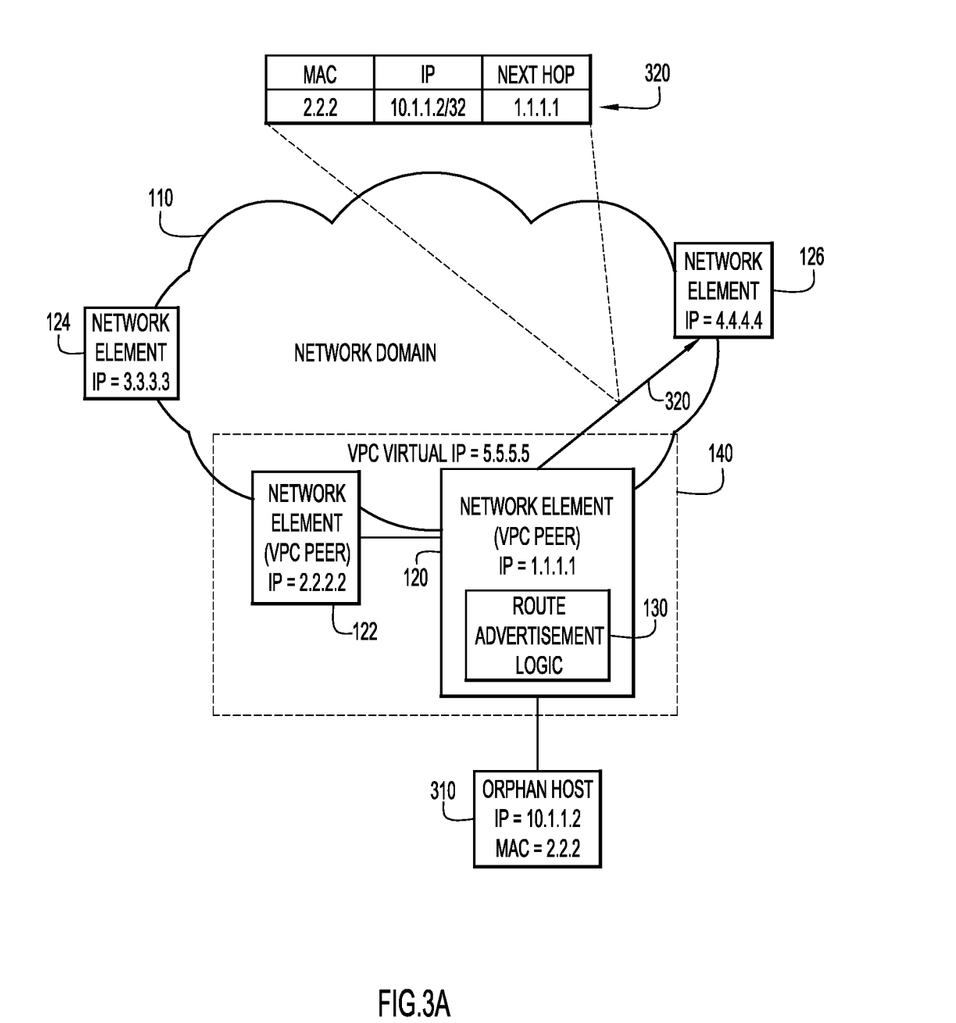
FIG. 3A illustrates advertising an orphan host using the individual network address of the peer VPC network element to which the orphan host is attached, according to an example embodiment.

Referring now to FIG. 3A, a simplified block diagram illustrates how the route advertisement logic 130 optimizes the route advertisement for an orphan host 310 that is attached to only one VPC peer 120 of the VPC 140. When the orphan host 310, which has a MAC address of 2.2.2 and an IP address of 10.1.1.2, connects to the network domain 110 via the VPC peer 120, but not the VPC peer 122, the route advertisement logic 130 sends a route advertisement message 320 (e.g., a BGP update message) throughout the network domain 110, such as to network element 126. The route advertisement message 320 includes the MAC address of the orphan host 210 (e.g., 2.2.2), the IP address/range of the host 310 (e.g., 10.1.1.2/32), and a next hop address that indicates the IP address to which messages to the host 210 should be addressed from within the network domain 110. Since the orphan host 210 is only attached to one of the VPC peers (e.g., network element 120), the route advertisement logic 130 includes the IP address of the VPC peer 120 to which the orphan host is attached (e.g., 1.1.1.1). In other words, any messages sent over the network domain 110 to the orphan host 310 will be addressed to the individual network address (e.g., 1.1.1.1) of the network element 120 to which it is attached, rather than the virtual network address of VPC 140 (e.g., 5.5.5.5).

Figure 3B:
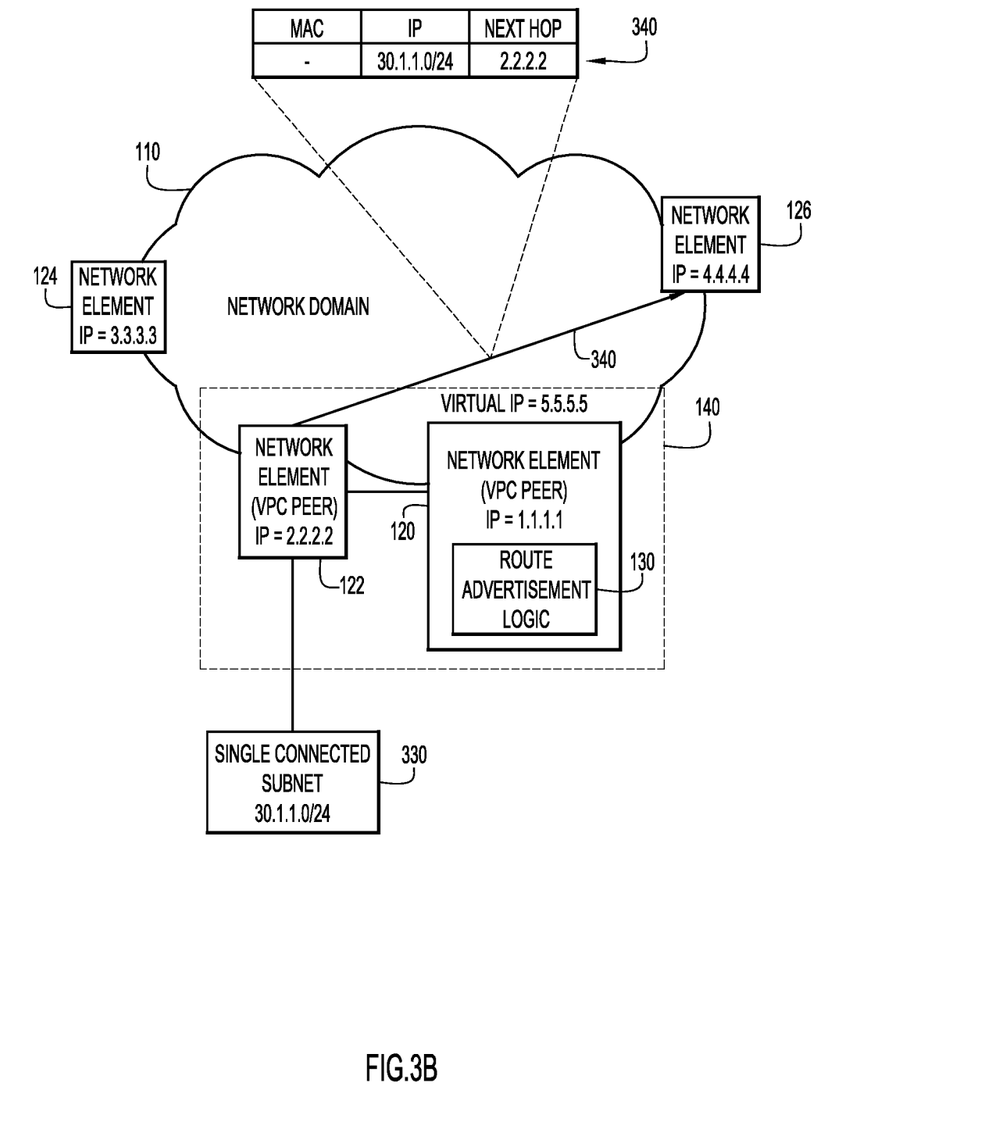
FIG. 3B illustrates advertising singly connected subnet using the individual network address of the peer VPC network element to which the subnet is attached, according to an example embodiment.

Referring now to FIG. 3B, a simplified block diagram illustrates how the route advertisement logic 130 optimizes the route advertisement for a single connected subnetwork 330 that is connected to only one VPC peer 122 of the VPC 140. Similar to the example described with respect to FIG. 3A, when the single connected subnetwork 330, which includes a range of IP address (e.g., 30.1.1.0/24), connects to the network domain 110 via the VPC peer 122, but not the VPC peer 120, the route advertisement logic 130 sends a route advertisement logic message 340 (e.g., a BGP update message) throughout the network domain 110, such as to network element 126. The route advertisement message 340 does not include a MAC address, since the subnetwork 330 may include multiple devices with multiple MAC addresses. However, the advertisement message 340 includes the IP address/range of the subnetwork 230 (e.g., 30.1.1.0/24), and a next hop address that indicates the IP address to which messages to hosts on the subnetwork 230 should be addressed from within the network domain 110. Since the single connected subnetwork 330 is only connected to the VPC peer 122, the route advertisement logic 130 includes the IP address of the VPC peer 122 (e.g., 2.2.2.2). In other words, any messages sent over the network domain 110 to hosts on the subnetwork 330 will be addressed to the individual network address (e.g., 2.2.2.2) of the network element 122, rather than the virtual network address of VPC 140 (e.g., 5.5.5.5).

Referring back to FIG. 2A and to FIG. 3A, the VPC peer network element 120 dynamically selects the next hop address for host routes according to varying conditions. In general, a host is dual/multi homed if the host is learned via a VPC peer link or as part of an ESI. If the host is dual/multi homed, then the BGP EVPN control plane will dynamically select the virtual IP address of the VPC as the next hop address of the host route. Alternatively, a host is single homed/orphaned if the host is learned via an individual port. If the host is single homed/orphaned, then the BGP EVPN control plane will dynamically select the IP address of the port/network element that found the host.

In addition to dynamically selecting the next hop address with a host that is first learned, the host route may be updated for other events that affect the reachability of the host. For instance, a VPC domain failure or recovery will affect whether the virtual IP address of the VPC is available as a next hop address. The failure (or recovery) of the VPC may be attributed to the failure/recovery of the VPC peer network elements and/or the VPC peer link. Additionally, while Address Resolution Protocol (ARP)/Neighbor Discovery (ND) entries may be synchronized between the VPC peers, the decision on whether or not reachability of a given host is advertised over the network domain may be based on whether the host is reachable via a locally attached leg (e.g., VPC or orphan). Further, the EVPN control plane may monitor for a host changing from being single homed/orphaned to dual/multi homed, or changing from being dual/multi homed to single homed/orphaned. In other words, when the host moves from being attached to a single network element to two (or more) network elements in a VPC, the control plane may change the route advertisement from the individual network address of the single network element to the virtual network address of the VPC. Similarly, when the host moves from being dual/multi homed to single homed/orphaned, the control plane may change the route advertisement from the virtual network address of the VPC to the individual network address of the single network element.

Referring back to FIG. 2B and to FIG. 3B, the VPC peer network element 120 dynamically selects the next hop address for network prefix routes according to varying conditions. A subnetwork is single homed (or orphaned) if it exists local to only one VPC peer network element. In this case, the BGP EVPN control plane selects the individual network address of the local network element as the next hop address. The next hop address selection process may be introduced through a route map that is applied when redistributing network prefix routes (e.g., EVPN Type 5 routes) into the BGP EVPN control plane. This may include external subnetworks as well as subnetworks associated with networks that are locally instantiated on the VPC peers. The route map may include a new "set" action to influence the selection of the next hop address. The "set" action may modify the next hop address in the BGP update messages when advertising reachability to other BGP peers. With the flexibility of the route map, this approach may be extended to other "match" objects to provide maximum flexibility in customizing the next hop address. This approach is not limited to the use cases described herein, and may be extended to other use cases.

Figure 4:
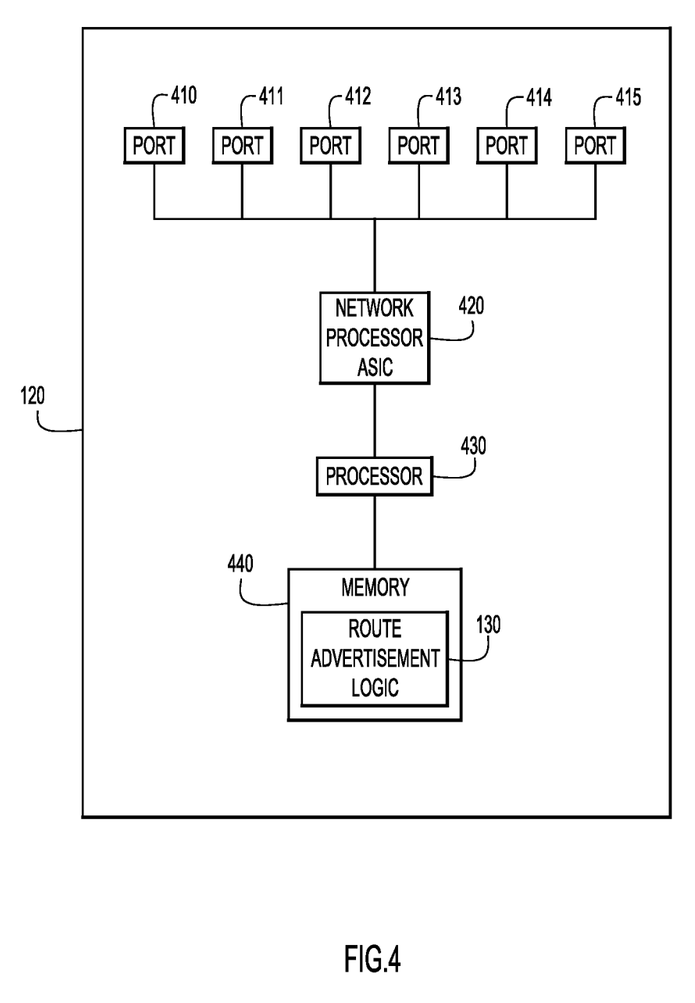
FIG. 4 is a simplified block diagram of a peer VPC network device configured to advertise routes for attached hosts or subnets, according to an example embodiment.

Referring now to FIG. 4, a simplified block diagram illustrates a network device (e.g., VPC peer network element 120) that is configured to participate in the techniques presented herein. The networking device includes a network interface unit in the form of a plurality of network ports 410-415, a processor Application Specific Integrated Circuit (ASIC) 420 that performs network processing functions, one or more processors 430 (e.g., microprocessors or microcontrollers), and memory 440. The network device 120 may include multiple network processor ASICs to perform various network processing functions. The memory 440 stores the route advertisement logic 130, which may include instructions for advertising host/subnetwork routes, such as via BGP update messages. It is to be understood that, in certain examples, the network device 120 may be a virtual (software-based) appliance. The processor 430 performs higher level control functions of the network device 120, in concert with functions of the network processor ASIC 420.

The memory 440 may include read only memory (ROM), random access memory (RAM), magnetic disk storage media devices, optical storage media devices, flash memory devices, electrical, optical, or other physical/tangible memory storage devices. Thus, in general, the memory 440 may comprise one or more tangible (non-transitory) computer readable storage media (e.g., a memory device) encoded with software comprising computer executable instructions and when the software is executed (by the one or more processors 430) it is operable to perform the operations described herein. For example, the memory 440 stores instructions for the route advertisement logic 130 described above. When the processor 430 executes the instructions for the route advertisement logic 130, the processor 430 is caused to control the network device 120 to perform the operations described herein. As an alternative, the functions of the route advertisement logic 130 may be performed by the network processor ASIC 420.

Figure 5:
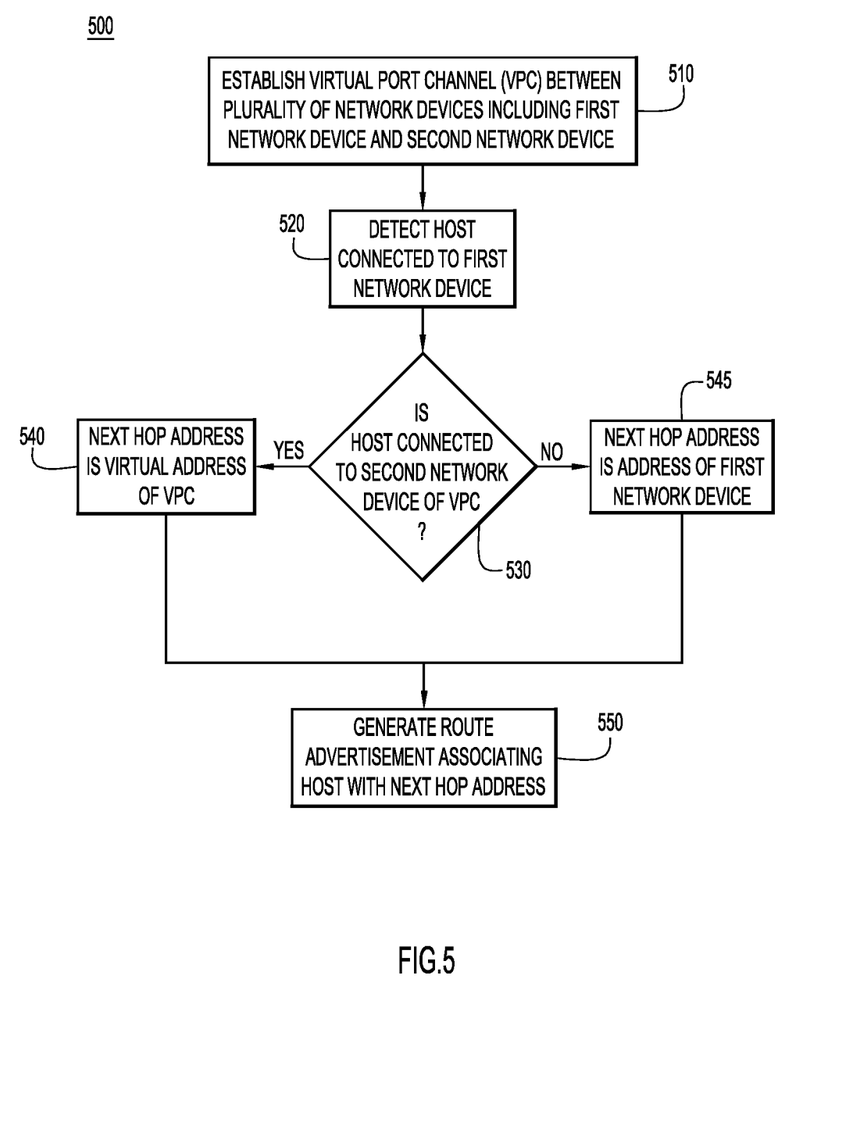
FIG. 5 is a flowchart depicting operations of a peer VPC network element advertising a route to an attached host, according to an example embodiment.

Referring now to FIG. 5, a flowchart illustrates a process 500 performed by a first network device (e.g., VPC peer network element 120) in selecting and advertising a host route for a host connected to the network device. In step 510, a VPC is established between a plurality of network devices including a first network device and a second network device. In one example, the first network device and the second network device are VPC peer devices. In step 520, the first network device detects a host connected to the first network device. In one example, the host may be a physical computing device, a virtual machine on a physical device, or a container workload running on a physical or virtual machine.

In step 530, the first network device determines whether the host is connected to the second network device of VPC. In one example, the first network device determines a next hop address for the host based on whether the host is connected to one or both of the first network device and the second network device. If the host is connected to second network device, as well as the first network device, then the first network device selects the virtual network address of the VPC as the next hop address of the host in step 540. Alternatively, if the host is only connected to the first network device, but not the second network device, then the first network device selects the network address of the first network device as the next hop address for the host in step 545.

In another example, the VPC may include more than the first network device and the second network device. In this instance, the first network device only selects the virtual network address as the next hop address if all of the peer devices in the VPC are connected to the host. If at least one of the peer devices in the VPC are not connected to the host, then the first network element will select the network address of the first device as the next hop address.

In step 550, the first network device generates a route advertisement associating the next hop address selected in either step 540 or step 545 with the host. In one example, the route advertisement may include a BGP update message.

The first network device may use a similar process to determine a next hop address for a subnetwork connected to one or both of the VPC peer network elements. The format of the route advertisement may differ when advertising a subnetwork instead of a host, but the steps of determining a next hop address will be similar between the two formats. For instance, advertising a host with an EVPN Type 2 route and advertising a subnetwork with an EVPN Type 5 route will not differ in how the first network device determines the next hop address to include in each type of route advertisement.

In summary, the techniques presented herein influence the selection of a next hop address for a network domain (e.g., an EVPN domain with BGP) that includes a VPC environment, to optimize forwarding, convergence, and hardware table usage in single/dual/multi homing scenarios. In one instance, the next hop address for a host route is dynamically selected based on the specific host connectivity options (e.g., single or dual/multi homed), which improves forwarding to orphan hosts specifically in VPC scenarios. Additionally, the new route map "set" action provides an extensible way to influence the selection of various selection objects (e.g., the next hop address). These approaches optimize the route advertisement for orphan/single homed hosts while keeping the flexibility for handling new use case scenarios.

In particular, the techniques presented herein avoid two hop forwarding for any traffic directed to orphan or singly connected hosts within a BGP EVPN fabric. Additionally, the dynamic selection of the next hop address optimizes the usage of FIB, MAC, and associated ECMP tables by using the virtual network address for dual/multi homed prefixes, and using individual network addresses of network elements for single homed/orphan prefixes.

In one form, a method is provided for a first network device in a virtual port channel. The method comprises establishing a virtual port channel associated with a virtual network address. The virtual port channel comprises a plurality of network devices including the first network device associated with a first network address and a second network device associated with a second network address. The method further comprises detecting that a host is connected to the first network device and determining a next hop address to associate with the host. The next hop address is determined based on whether the host is also connected to the second network device of the virtual port channel. The method also comprises generating a route advertisement associating the next hop address with the host.

In another form, an apparatus is provided comprising a network interface unit and a processor. The network interface unit is configured to communicate over a computer network with computing devices. The processor is configured to establish a virtual port channel associated with a virtual network address. The virtual port channel comprises a plurality of network devices including the apparatus as a first network device associated with a first network address and a second network device associated with a second network address. The processor is also configured to detect that a host is connected to the first network device via the network interface unit and determine a next hop address to associate with the host. The processor determines the next hop address based on whether the host is also connected to the second network device of the virtual port channel. The processor is further configured to generate a route advertisement associating the next hop address with the host.

In still another form, one or more non-transitory computer readable storage media is encoded with software comprising computer executable instructions and, when the software is executed by a processor on a first network device, operable to cause the processor to establish a virtual port channel associated with a virtual network address. The virtual port channel comprises a plurality of network devices including the first network device associated with a first network address and a second network device associated with a second network address. The instructions are also operable to cause the processor to detect that a host is connected to the first network device and determine a next hop address to associate with the host. The instructions cause the processor to determine the next hop address based on whether the host is also connected to the second network device of the virtual port channel. The instructions also cause the processor to generate a route advertisement associating the next hop address with the host.

The above description is intended by way of example only. Although the present disclosure has been described in detail with reference to particular arrangements and configurations, these example configurations and arrangements may be changed significantly without departing from the scope of the present disclosure. In particular, while specific protocols, such as EVPN, BGP, and VPC, have been used herein as examples, other protocols may be used by a person of ordinary sill in the art with a scope similar to the present disclosure. Additionally, while subnetworks have been described herein as connected to one or more network elements, subnetworks that are locally originated may also be used by a person of ordinary skill in the art in a manner similar to what is presented in the present disclosure.

What is claimed is:

1. A method comprising:
    establishing a virtual port channel associated with a virtual network address, the virtual port channel comprising a plurality of network devices including a first network device associated with a first network address and a second network device associated with a second network address;
    detecting that a subnetwork is connected to the first network device;
    determining whether to associate the virtual network address or the first network address as a next hop address for the subnetwork based on whether the subnetwork is also connected to the second network device of the virtual port channel; and
    generating a route advertisement associating the next hop address with a range of addresses in the subnetwork.

2. The method of claim 1, wherein determining the next hop address comprises setting the next hop address to be the virtual network address if the subnetwork is connected to both the first network device and the second network device.

3. The method of claim 2, further comprising:
    detecting that the subnetwork is no longer connected to the second network device; and
    updating the next hop address in the route advertisement to be the first network address.

4. The method of claim 1, wherein determining the next hop address comprises setting the next hop address to be the first network address if the subnetwork is not connected to the second network device.

5. The method of claim 1, further comprising sending the route advertisement to at least one other network device that is not among the plurality of network devices in the virtual port channel.

6. The method of claim 1, wherein the plurality of network devices in the virtual port channel includes more than two network devices, the method further comprising setting the next hop address to be the virtual network address only if the subnetwork is connected to all of the plurality of network devices in the virtual port channel.

7. An apparatus comprising:
    a network interface unit configured to communicate over a network; and
    a processor configured to:
        establish a virtual port channel associated with a virtual network address, the virtual port channel comprising a plurality of network devices including the apparatus as a first network device associated with a first network address and a second network device associated with a second network address;
        detect that a subnetwork is connected to the first network device via the network interface unit;
        determine whether to associate the virtual network address or the first network address as a next hop address for the subnetwork based on whether the subnetwork is also connected to the second network device of the virtual port channel; and
        generate a route advertisement associating the next hop address with a range of addresses in the subnetwork.

8. The apparatus of claim 7, wherein the processor is configured to determine the next hop address by setting the next hop address to be the virtual network address if the subnetwork is connected to both the first network device and the second network device.

9. The apparatus of claim 8, wherein the processor is further configured to:
    detect that the subnetwork is no longer connected to the second network device; and
    update the next hop address in the route advertisement to be the first network address.

10. The apparatus of claim 7, wherein the processor is configured to determine the next hop address by setting the next hop address to be the first network address if the subnetwork is not connected to the second network device.

11. The apparatus of claim 7, wherein the processor is further configured to cause the network interface unit to send the route advertisement to at least one other network device that is not among the plurality of network devices in the virtual port channel.

12. The apparatus of claim 7, wherein the plurality of network devices in the virtual port channel includes more than two network devices, and wherein the processor is configured to determine the next hop address by setting the next hop address to be the virtual network address only if the subnetwork is connected to all of the plurality of network devices in the virtual port channel.

13. One or more non-transitory computer readable storage media encoded with software comprising computer executable instructions and, when the software is executed by a processor on a first network device, operable to cause the processor to:
    establish a virtual port channel associated with a virtual network address, the virtual port channel comprising a plurality of network devices including the first network device associated with a first network address and a second network device associated with a second network address;
    detect that a subnetwork is connected to the first network device;
    determine whether to associate the virtual network address or the first network address as a next hop address for the subnetwork based on whether the subnetwork is also connected to the second network device of the virtual port channel; and
    generate a route advertisement associating the next hop address with a range of addresses in the subnetwork.

14. The non-transitory computer readable storage media of claim 13, further comprising instructions operable to cause the processor to determine the next hop address by setting the next hop address to be the virtual network address if the subnetwork is connected to both the first network device and the second network device.

15. The non-transitory computer readable storage media of claim 14, further comprising instructions operable to cause the processor to:
    detect that the subnetwork is no longer connected to the second network device; and
    update the next hop address in the route advertisement to be the first network address.

16. The non-transitory computer readable storage media of claim 13, further comprising instructions operable to cause the processor to determine the next hop address by setting the next hop address to be the first network address if the subnetwork is not connected to the second network device.

17. The non-transitory computer readable storage media of claim 13, further comprising instructions operable to cause the processor to send the route advertisement to at least one other network device that is not among the plurality of network devices in the virtual port channel.

18. The non-transitory computer readable storage media of claim 13, the plurality of network devices in the virtual port channel includes more than two network devices, the non-transitory computer readable storage media further comprising instructions operable to cause the processor to determine the next hop address by setting the next hop address to be the virtual network address only if the sub-network is connected to all of the plurality of network devices in the virtual port channel.

\* \* \* \* \*